No. 850,812. PATENTED APR. 16, 1907.
J. BINNIG.
VALVE DEVICE.
APPLICATION FILED MAY 11, 1906.
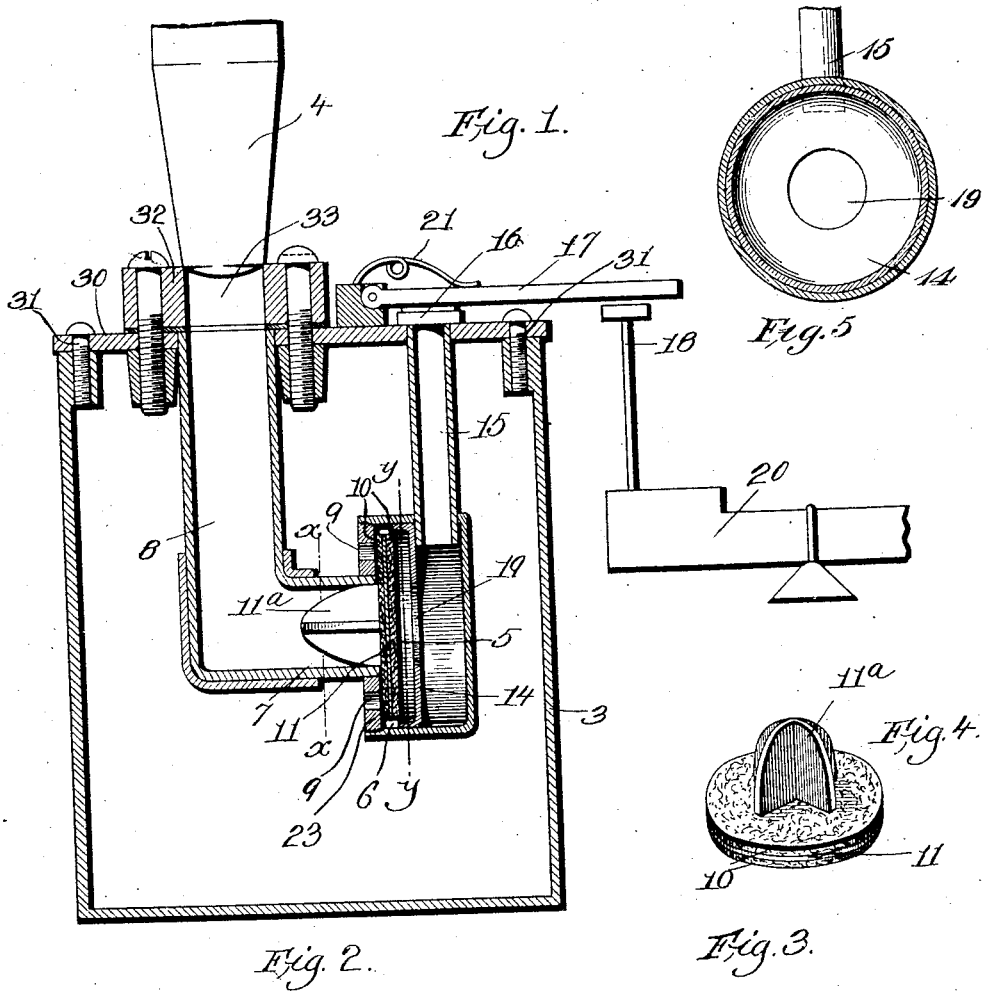
Witnesses.
W. C. Lunsford
Walter R. Trott
Inventor.
Jacob Binnig,
by Cromby & Gregory
Attys.

UNITED STATES PATENT OFFICE.

JACOB BINNIG, OF BOSTON, MASSACHUSETTS, ASSIGNOR OF ONE-HALF TO MASON & HAMLIN COMPANY, OF CAMBRIDGE, MASSACHUSETTS, A CORPORATION OF DELAWARE.

VALVE DEVICE.

No. 850,812.   Specification of Letters Patent.   Patented April 16, 1907.

Application filed May 11, 1906. Serial No. 316,273.

*To all whom it may concern:*

Be it known that I, JACOB BINNIG, a citizen of the United States, residing at Boston, county of Suffolk, and State of Massachusetts, have invented an Improvement in Valve Devices, of which the following description, in connection with the accompanying drawings, is a specification, like letters on the drawings representing like parts.

This invention relates to valves which are especially adapted for use in wind instruments or automatic musical instruments, although the invention is such that a valve embodying it might be used in other relations.

Most pneumatically-operated valves in automatic musical instruments or in wind instruments are either in the form of a diaphragm or are connected to and operated by a diaphragm, and the port controlled by the valve is opened and closed by shifting the position of the diaphragm, this being done generally by varying the pressure which acts against the diaphragm.

My improved invention aims to provide a valve which may be used either as a pneumatic or as a pipe-valve and in various other ways, which valve can be operated without the use of diaphragms and merely by varying the air tension on one side of the valve. My improved valve is preferably in the form of a disk valve which is loosely received within a valve-chamber, and the construction is such as will be more fully hereinafter described, that by merely varying the air tension in the valve-chamber on one side of the valve the position of the valve may be shifted to open and close the inlet and discharge ports, as desired.

A valve embodying my invention is extremely simple in construction and quick and accurate in operation. Such valves may be used in a variety of ways, either as pneumatics or as pipe-valves or, in fact, in almost any position in a musical instrument where a pneumatically-operated valve is employed. The valve, however, is not limited in its use to musical instruments, but obviously may be used in other relationships.

For the sake of illustrating my invention I have shown it as embodied in a valve adapted to control the supply of wind to a pipe in a pipe-organ; but I wish it understood that this embodiment of the invention is chosen merely for illustrative purposes and that the invention may be embodied in valves used for other purposes than that herein illustrated.

Figure 1 is a sectional view through a wind-chest, showing one way of constructing my improved valve and of operating it. Fig. 2 is a section on the line $x\ x$, Fig. 1; and Fig. 3 is a section on the line $y\ y$, Fig. 1, looking toward the left. Fig. 4 is a perspective view of the disk valve detached. Fig. 5 is a view of the valve on the line $y\ y$, Fig. 1, looking to the right.

My improved valve is shown at 5, and it is located within a suitable valve-chamber 6, which is provided with a discharge-port 7, one or more inlet-ports 9, and a vent-port 19. When the valve is used as a pipe-valve to control the supply of air to a pipe 4, as in the drawings, the discharge-port 7 will be connected to the pipe by a suitable conduit 8 and the inlet port or ports 9 will have communication with a wind-chest 3, so that when the valve is open the wind from the wind-chest may pass through the inlet port or ports 9 to the discharge-port 7 and thence to the pipe 4 through the conduit 8. The inlet-ports 9 are located on the same side of the valve-chamber as the discharge-port 7, and the valve 5, which is a disk valve, is large enough to cover both the inlet-port and the discharge-port when said valve is seated, as shown in full lines, Fig. 1. Said valve may be made in various ways, but preferably is merely a disk of leather suitably stiffened, so that it will hold its shape. One convenient way of securing the requisite stiffness is to place between two separate disks 10, of leather, a metal stiffening-disk 11. The valve may be guided in its movement in any suitable way. I have herein shown said valve as having a winged stem $11^a$, which extends through the discharge-port 7 and which acts to guide the valve and hold it in position.

A normally closed vent-pipe 15 communicates with the vent-port 19. Under normal conditions with the vent-pipe 15 closed the valve 5 is held to its seat by the pressure within the valve-chamber back of the valve, this pressure extending over the entire area of the valve, and thus overbalancing the pressure in the inlet port or ports on the front of the valve. As soon as the pressure at the back of the valve is released by opening the vent-pipe the pressure against the valve through the inlet-ports is sufficient to force the valve off from its seat and against the flange 14, which has the vent-port 19 therein. When the valve is in this position, the wind may pass through the inlet port or ports 9 directly to the discharge-port and from said discharge-port to the device to be operated, which is this instance is the pipe 4. When the valve 5 has moved to open the discharge-port 7, said valve seats against the flange 14, and thereby prevents the escape of any air out through the vent-port 19 and vent-pipe 15. As soon as the vent-pipe is closed, however, the pressure behind the valve 5 will increase, owing to leakage of air around the valve and through the vent-port 19, and when this pressure reaches such a point that the pressure against the back of the valve overbalances that against the front of the valve the valve will seat itself. In practice this action takes place almost instantly and the valve works very quickly, merely by opening and closing the vent-pipe 15.

The valve 5, it will be noted, acts to control not only the inlet-port and the discharge-port, but also the vent-port, and when the vent-pipe is closed said valve is held to its seat by pressure, which is admitted to the valve-chamber around the valve through the inlet port.

The vent-pipe 15 may be opened and closed as desired in a variety of ways. This might be done by means of a perforated music-sheet passing over said pipe or by means of primary or secondary valve mechanisms. As a simple means for accomplishing it, however, I have herein illustrated a valve 16, carried by a pivoted arm 17, which is adapted to be engaged by a striker 18, carried by a key 20. The arm 17 is acted upon by a suitable spring 21, which tends to seat the valve 16 and close the vent-pipe when the key 20 is released. My invention, however, would not be departed from if the valve for controlling the vent-pipe 15 were operated by a primary or secondary pneumatic.

The valve-chamber 6 is preferably made of metal and may be made in any suitable way; but preferably it is stamped to shape and then the flange 14 soldered or otherwise secured therein. The end 23 thereof, through which the inlet-ports extend, is preferably adjustably mounted in some suitable way, as by screw-threading it into the valve-chamber. The purpose of this adjustment is to secure the proper distance between the inlet-ports and the flange 14. In order to get the quick and certain action of the valve above described, it is desirable that the movement of the valve 5 be limited.

As stated above, where my improved valve is used as a pipe-valve the inlet-ports 9 have communication with the wind-chest 3, and while this communication may be established in any suitable way I have herein shown the pipe-valve as located within the wind-chest, so that the inlet-ports 9 open directly thereinto. The position of the valve with relation to the wind-chest, however, forms no part of the invention, and a communication between the inlet-ports and the wind-chest or its equivalent may be established in any suitable way.

The pipe 4 is shown as resting on an upper board 32, which has a port 33 therein, and this upper board is secured to the top 30 of the wind-chest. The top 30 of the wind-chest is shown as secured in place by screws 31. It will be noted that with my invention no pneumatic is required for operating the valve and that the operation of the valve is secured merely by varying the pressure on one side thereof. Further, the construction is such that the pressure necessary for closing the valve comes directly from the wind-chest, which supplies the pressure for operating the device controlled by the valve, and no source of pressure is required for operating the valve which is independent and separate from the pressure for operating the pipe or other device to be operated. This makes an extremely simple construction.

I have herein shown a simple embodiment only of my invention and have not attempted to illustrate the various ways in which the invention might be embodied.

Having fully described my invention, what I claim as new, and desire to secure by Letters Patent, is—

1. A valve device comprising a valve-chamber having an inlet-port and a discharge-port on one side thereof and a vent-port on the opposite side thereof, combined with a valve loosely sustained in said chamber and adapted in one position to close the discharge-port and in another position to close the vent-port, and means separate from said valve to vary the pressure in the valve-chamber, thereby to operate the valve.

2. A valve device comprising a valve-chamber having an inlet-port and a discharge-port located on the same side thereof and a vent-port located on the opposite side, combined with a disk valve loosely sustained in the valve-chamber and adapted in one position to close the discharge-port and in another position to close the vent-port, and means separate from said valve to vary the pressure thereon, thereby to operate the latter.

3. A valve device comprising a valve-chamber having on the same side thereof both an inlet-port in communication with a source of air-tension and a discharge-port, a vent-port extending through the opposite side thereof, combined with a disk valve loosely sustained in said chamber and adapted in one position to close the discharge-port and in another position to close the vent-port, and means to vary the pressure on that side of the valve facing the vent-port, thereby to operate said valve.

4. A valve device comprising a valve-chamber having inlet and discharge ports on the same side thereof, combined with a loosely-sustained disk valve in said chamber, and means separate from the valve to cause said valve to seat itself to close the discharge-port.

5. A valve device comprising a valve-chamber having inlet and discharge ports on the same side thereof, combined with a wind-chest communicating with the inlet-port, a valve loosely sustained in said chamber and seated and unseated by the change of pressure on the side thereof opposite to that facing the inlet-port and means separate from the valve to vary said pressure.

6. A valve device comprising a valve-chamber having an inlet-port and a discharge-port on the same side thereof and a vent-port on the opposite side thereof, combined with a disk valve loosely sustained in said valve-chamber, a vent-pipe separate from the valve communicating with the vent-port, and means to close the vent-pipe.

7. A valve device comprising a valve-chamber having an inlet and a discharge port on the same side thereof and a vent-port on the opposite side, combined with a pressure-chamber communicating with the inlet-port, a disk valve loosely sustained within the valve-chamber, the diameter of the valve being slightly smaller than that of the chamber, whereby the pressure of the air entering the valve-chamber through the inlet-port and accumulating in the valve-chamber keeps the valve seated to close the discharge-port, and means separate from the valve to vent the valve-chamber through the vent-port to permit the valve to open.

8. A valve device comprising a valve-chamber having an inlet-port and a discharge-port on the same side thereof, combined with a vent-pipe separate from the valve opening into the opposite side of the valve-chamber, and a disk valve loosely sustained in said valve-chamber, and means to open and close the vent-pipe.

9. A valve comprising a valve-chamber 6 having inlet-ports 9 and a discharge-port 7 on the same side thereof, combined with a vent-pipe 15 separate from the valve communicating with the valve-chamber on the opposite side thereof, and a disk valve 5 loosely sustained in the valve-chamber.

10. A valve device comprising a valve-casing having an inlet and a discharge port on one side thereof and a vent-port extending through the opposite side thereof, combined with a valve loosely sustained in said chamber and adapted in one position to close the discharge-port and in another position to open the discharge-port and close the vent-port, and means to vary the pressure in the valve-chamber, thereby to operate the latter.

In testimony whereof I have signed my name to this specification in the presence of two subscribing witnesses.

JACOB BINNIG.

Witnesses:
 LOUIS C. SMITH,
 BERTHA F. TENSER.